United States Patent
Kano

(10) Patent No.: US 9,756,201 B2
(45) Date of Patent: Sep. 5, 2017

(54) INFORMATION PROCESSING SYSTEM, INFORMATION PROCESSING DEVICE, AND PROGRAM HAVING DIFFERENT BROWSER FUNCTIONS PERTAINING TO A PLURALITY OF WEB SERVERS

(71) Applicant: Konica Minolta, Inc., Chiyoda-ku, Tokyo (JP)

(72) Inventor: Takahiro Kano, Toyonaka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/834,882

(22) Filed: Aug. 25, 2015

(65) Prior Publication Data

US 2016/0065762 A1    Mar. 3, 2016

(30) Foreign Application Priority Data

Aug. 26, 2014 (JP) ................................. 2014-171324

(51) Int. Cl.
*G06F 3/12* (2006.01)
*H04N 1/00* (2006.01)

(52) U.S. Cl.
CPC ..... *H04N 1/00464* (2013.01); *H04N 1/00244* (2013.01); *H04N 1/00413* (2013.01); *H04N 1/00962* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2008/0155095 A1* | 6/2008 | Yamaguchi | ............. | G06F 21/31 709/224 |
| 2010/0165392 A1* | 7/2010 | Yabe | .................. | G06F 21/6218 358/1.15 |
| 2012/0050795 A1* | 3/2012 | Nakamura | ............ | G06F 3/1207 358/1.15 |

FOREIGN PATENT DOCUMENTS

| | | |
|---|---|---|
| JP | 2009-193473 A | 8/2009 |
| JP | 2010-057135 A | 3/2010 |

(Continued)

OTHER PUBLICATIONS

Notice of Reasons for Rejection dated Oct. 21, 2016 issued in the corresponding Japanese Patent Application No. 2014-171324 and English language translation (15 pages).

*Primary Examiner* — Henok A Shiferaw
(74) *Attorney, Agent, or Firm* — Buchanan Ingersoll & Rooney PC

(57) ABSTRACT

An information processing system includes a first web server and a second web server that communicate with each other via a browser, wherein the first web server includes a first web page generating unit, and a first communicating unit, the second web server includes a second web page generating unit, and a second communicating unit, the first web server allows the browser to execute a first script, in which state the browser functions as a web page acquiring unit, a first data input/output control unit, and a first server communication control unit, the second web server allows the browser to execute a second script, in which state the browser functions as the second data input/output control unit, and a second server communication control unit, and the first web server and the second web server transmit and receive data to and from the opposite server via the browser.

14 Claims, 14 Drawing Sheets

(56) References Cited

FOREIGN PATENT DOCUMENTS

| JP | 2011-65374 | 3/2011 |
|---|---|---|
| WO | 2014/004583 A1 | 1/2014 |

\* cited by examiner

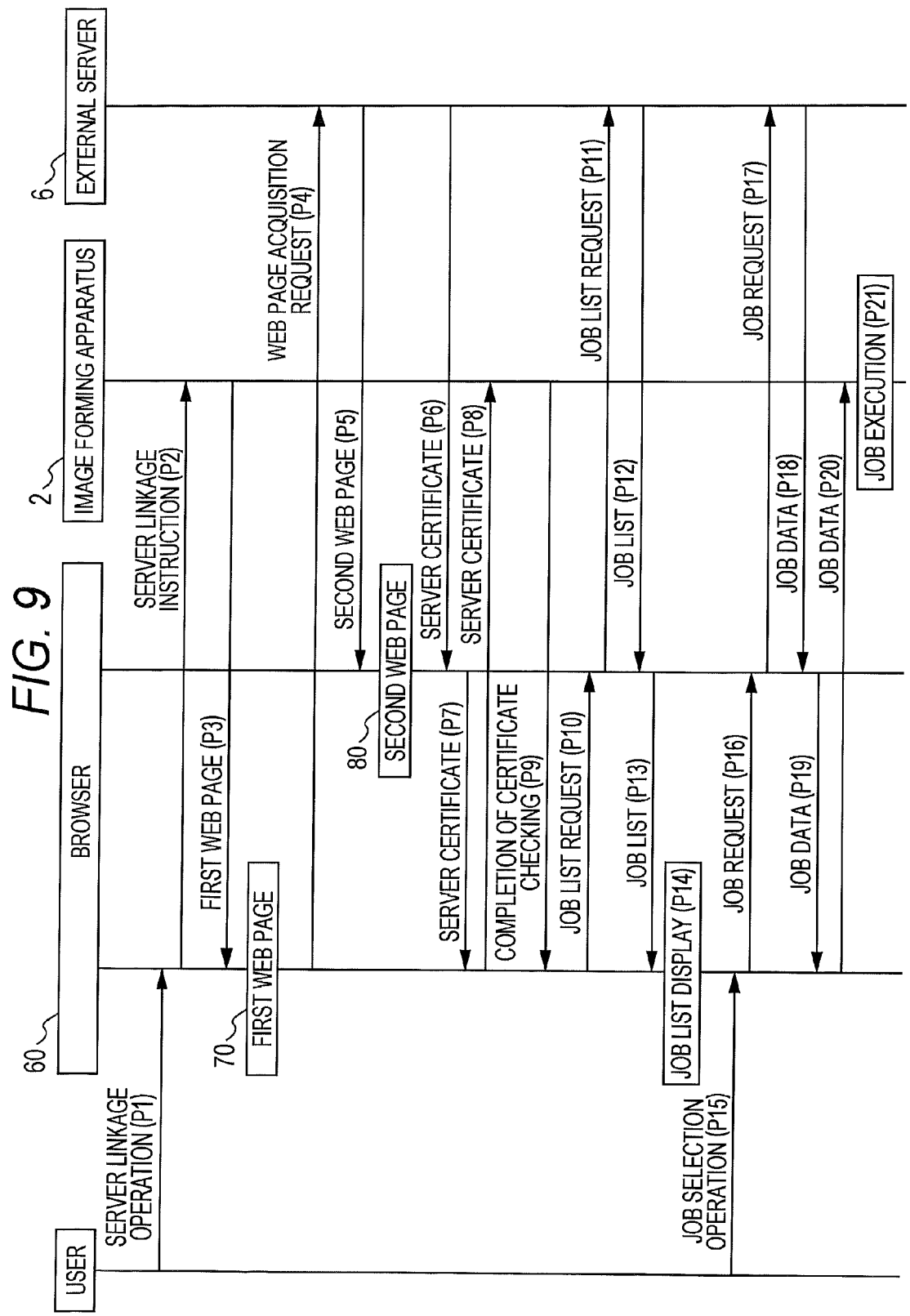

# INFORMATION PROCESSING SYSTEM, INFORMATION PROCESSING DEVICE, AND PROGRAM HAVING DIFFERENT BROWSER FUNCTIONS PERTAINING TO A PLURALITY OF WEB SERVERS

The entire disclosure of Japanese Patent Application No. 2014-171324 filed on Aug. 26, 2014 including description, claims, drawings, and abstract are incorporated herein by reference in its entirety.

BACKGROUND OF THE INVENTION

Field of the Invention

The present invention relates to an information processing system, an information processing device, and a program, and more particularly to a technology for data exchange between a plurality of web servers.

Description of the Related Art

Generally, in forming an image based on document data retained in a web server provided on a cloud such as the Internet, a client such as a personal computer starts a web browser (hereinafter abbreviated as "browser") to download and acquire the document data from the web server. Then, the client starts an application supporting a file format of the downloaded document data to open the document data by using the application. When a printing instruction is issued under the application, the client starts a printer driver and forms an image of the downloaded document data by using the printer driver. However, this method requires a user to sequentially perform a plurality of operations, including downloading of document data, starting of an application, designation of downloaded document data, and issue of a printing command, which are laborious and time-consuming work.

For simplifying these work, a technology currently proposed uses an image formation support device provided between the web server and the client (browser) (for example, see JP 2011-65374 A). According to this conventional technology, the image formation support device generates a web page displayable by the browser, and outputs the web page to the client. Then, the image formation support device downloads document data from the web server in response to operation input to the web page from the user, and displays the document data as preview on the web page displayed on the client side. When the user performs printing operation through the web page, the image formation support device extracts a part or all of data designated by the user from the downloaded document data, and transfers the extracted data to an image forming apparatus. Accordingly, the user is capable of forming an image only by operating the web page output from the image formation support device.

According to the conventional technology described in JP 2011-65374 A, however, the necessity of additionally equipping the image formation support device raises costs.

SUMMARY OF THE INVENTION

For solving the aforementioned problems, it is an object of the present invention to provide an information processing system, an information processing device, and a program, capable of simplifying operation procedures at the time of transfer of data stored in a web server to another device so that easy and rapid data transfer is achievable without raising costs.

To achieve the abovementioned object, according to an aspect, an information processing system reflecting one aspect of the present invention comprises a first web server and a second web server that communicate with each other via a browser started by an information processing device, wherein the first web server includes a first web page generating unit that generates a first web page containing a first script executable by the browser in response to a web page acquisition request from the browser, and a first communicating unit that outputs the first web page to the browser, and receives data output from the browser, the second web server includes a second web page generating unit that generates a second web page containing a second script executable by the browser in response to a web page acquisition request from the browser, and a second communicating unit that outputs the second web page to the browser, and receives data output from the browser, the first web server allows the browser to execute the first script contained in the first web page, in which state the browser functions as a web page acquiring unit that acquires the second web page from the second web server, a first data input/output control unit that transfers and obtains data to and from a second data input/output control unit which functions when the browser executes the second script contained in the second web page acquired by the web page acquiring unit, and a first server communication control unit that transmits and receives data to and from the first web server as data transferred and obtained between the first data input/output control unit and the second data input/output control unit, the second web server allows the browser to execute the second script contained in the second web page, in which state the browser functions as the second data input/output control unit, and a second server communication control unit that transmits and receives data to and from the second web server as data transferred and obtained between the second data input/output control unit and the first data input/output control unit, and the first web server and the second web server transmit and receive data to and from the opposite server via the browser.

An invention of Item. 2 of the present invention is directed to the information processing system of Item. 1, wherein the first web server preferably allows the browser to display the first web page when the first communicating unit outputs the first web page to the browser, and prohibits the browser from displaying the second web page when the web page acquiring unit acquires the second web page.

An invention of Item. 3 of the present invention is directed to the information processing system of Item. 2, wherein, when the first data input/output control unit acquires a data list from the second data input/output control unit, the data list is preferably displayed on the first web page.

An invention of Item. 4 of the present invention is directed to the information processing system of Item. 3, wherein, when at least one data contained in the data list is selected in a state that the data list is displayed on the first web page, the first data input/output control unit preferably acquires the selected data from the second web server via the second data input/output control unit, and transmits the selected data to the first web server via the first server communication control unit.

An invention of Item. 5 of the present invention is directed to the information processing system of any one of Items. 1 to 4, wherein the information processing device is preferably connected with each of the first web server and the second web server via a network, and the browser preferably acquires the first web page and the second web page from the first web server and the second web server, respectively, via the network.

An invention of Item. 6 of the present invention is directed to the information processing system of any one of Items. 1 to 5, wherein the first web server is preferably mounted on an image forming apparatus that includes an image forming unit capable of forming an image based on input image data, and outputs image data to the image forming unit when the first communicating unit acquires the image data from the second web server via the browser.

To achieve the abovementioned object, according to an aspect, an information processing device that includes a web server function reflecting one aspect of the present invention comprises: a web page generating unit that generates a first web page incorporating a script executable by a browser in response to a web page acquisition request from the browser; and a communicating unit that outputs the first web page to the browser, and receives data output from the browser, wherein the web page generating unit generates the first web page incorporating a script that allows the browser to functions as a web page acquiring unit that acquires a second web page from a different web server, a first data input/output control unit that transfers and obtains data to and from a second data input/output control unit which functions when the browser executes a script contained in the second web page acquired by the web page acquiring unit, and a server communication control unit that transmits and receives data to and from the communicating unit as data transferred and obtained between the first data input/output control unit and the second data input/output control unit, and the information processing device transmits and receives data to and from the different web server via the browser.

An invention of Item. 8 of the present invention is directed to the information processing device of Item. 7, the information processing device preferably allowing the browser to display the first web page when the communicating unit outputs the first web page to the browser, and prohibiting the browser from displaying the second web page when the web page acquiring unit acquires the second web page.

An invention of Item. 9 of the present invention is directed to the information processing device of Item. 8, wherein, when the first data input/output control unit acquires a data list from the different web server via the second data input/output control unit, the data list is preferably displayed on the first web page.

An invention of Item. 10 of the present invention is directed to the information processing device of Item. 9, wherein, when at least one data contained in the data list is selected in a state that the data list is displayed on the first web page, the first data input/output control unit preferably acquires the selected data from the second web server via the second data input/output control unit, and transmits the selected data to the information processing device via the server communication control unit.

An invention of Item. 11 of the present invention is directed to the information processing device of any one of Items. 7 to 10, preferably further comprising an image forming unit that forms an image based on input image data, wherein the communicating unit preferably outputs image data to the image forming unit at the time of acquisition of the image data from the different web server via the browser.

To achieve the abovementioned object, according to an aspect, a non-transitory recording medium storing a computer readable program reflecting one aspect of the present invention, the program executed by an information processing device, and allowing the information processing device to function as a web page generating unit that generates a first web page incorporating a script executable by a browser in response to a web page acquisition request from the browser, and a communicating unit that outputs the first web page to the browser, and receives data output from the browser, wherein the web page generating unit generates the first web page incorporating a script that allows the browser to functions as a web page acquiring unit that acquires a second web page from a different web server, a first data input/output control unit that transfers and obtains data to and from a second data input/output control unit which functions when the browser executes a script contained in the second web page acquired by the web page acquiring unit, and a server communication control unit that transmits and receives data to and from the communicating unit as data transferred and obtained between the first data input/output control unit and the second data input/output control unit.

To achieve the abovementioned object, according to an aspect, a non-transitory recording medium storing a computer readable script program reflecting one aspect of the present invention, the script program incorporated in a first web page output from a first web server to a browser, and executed by the browser to allow the browser to function as a web page acquiring unit that acquires a second web page from a second web server different from the first web server, a first data input/output control unit that transfers and obtains data to and from a second data input/output control unit which functions when the browser executes a script contained in the second web page acquired by the web page acquiring unit, and a server communication control unit that transmits and receives data to and from the first web server as data transferred and received between the first data input/output control unit and the second data input/output control unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 9 is a view illustrating operation processes executed when data accumulated in the external server is submitted to the image forming apparatus as job data;

DESCRIPTION OF THE PREFERRED EMBODIMENTS

Hereinafter, a preferred embodiment of the present invention will be described in detail with reference to the drawings. However, the scope of the invention is not limited to the illustrated examples. Similar components in the embodiment described herein are given similar reference numbers, and the same description of these components is not repeatedly made.

Figure 1:
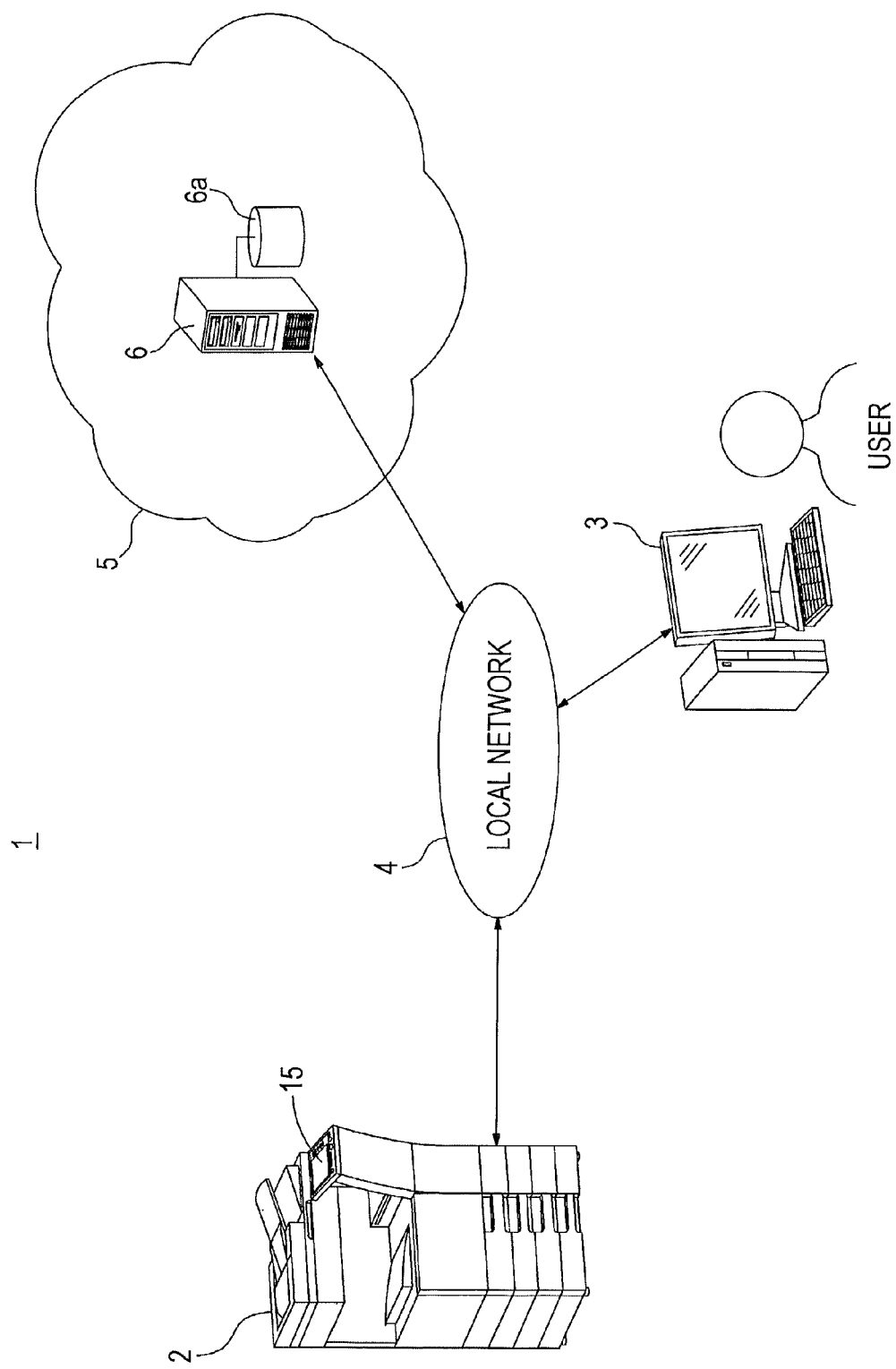
FIG. 1 is a view illustrating a configuration example of an information processing system.

FIG. 1 is a view illustrating a configuration example of an information processing system 1 according to this embodiment. The information processing system 1 includes an image forming apparatus 2 constituted by Multifunction Peripherals (MFP) or the like, an information processing device 3 constituted by a personal computer, a tablet terminal, a smartphone or the like, and an external server 6 contained in a cloud 5 provided on the Internet. The image forming apparatus 2 and the information processing device 3 are connected with a local network 4 such as a Local Area Network (LAN). The local network 4 is connected with the Internet via a not-shown router or the like so as to be connectable with the external server 6 contained in the cloud 5. Accordingly, the image forming apparatus 2, the information processing device 3, and the external server 6 are capable of achieving mutual data communication via networks including the local network 4 and the Internet.

The image forming apparatus 2 is capable of forming an image based on various types of image data such as a document received via the local network 4, and outputting printing. The image forming apparatus 2 has an image reading function, a facsimile function, a BOX function, and other functions as well as the image forming function. The image forming apparatus 2 according to this embodiment has a web server function which generates a web page containing various types of web content and outputs the generated web page, thereby functioning as an information processing device which executes various types of information processing by using this web server function.

The image forming apparatus 2 thus constructed includes an operation panel 15 which functions as a user interface at the time of operation by a user. The operation panel 15 displays various operation screens operable by the user. For example, when a browser program 19 installed in the image forming apparatus 2 beforehand, as will be described later, is started, a web page generated by the web server function of the image forming apparatus 2 is displayed on the operation panel 15.

The external server 6 is a server which provides a storage service in the cloud 5 for storing various types of data such as document data and image data, for example. The external server 6 includes a storing unit 6a constituted by a hard disk drive (HDD) or the like, and stores in the storing unit 6a various types of data uploaded via the Internet to manage the data. Similarly to the image forming apparatus 2, the external server 6 has a web server function which generates a web page containing various types of web content and outputs the web page. Accordingly, the external server 6 is capable of achieving data communication with other devices connected with the local network 4 by using the web server function.

Each of the image forming apparatus 2 and the external server 6 thus constructed is capable of outputting a web page to a bowser started by the information processing device 3, for example. According to this embodiment, each of the image forming apparatus 2 and the external server 6 is configured to transmit and receive data in linkage with each other via the browser started by the information processing device 3. The information processing system 1 having this configuration will be further detailed later.

Figure 2:
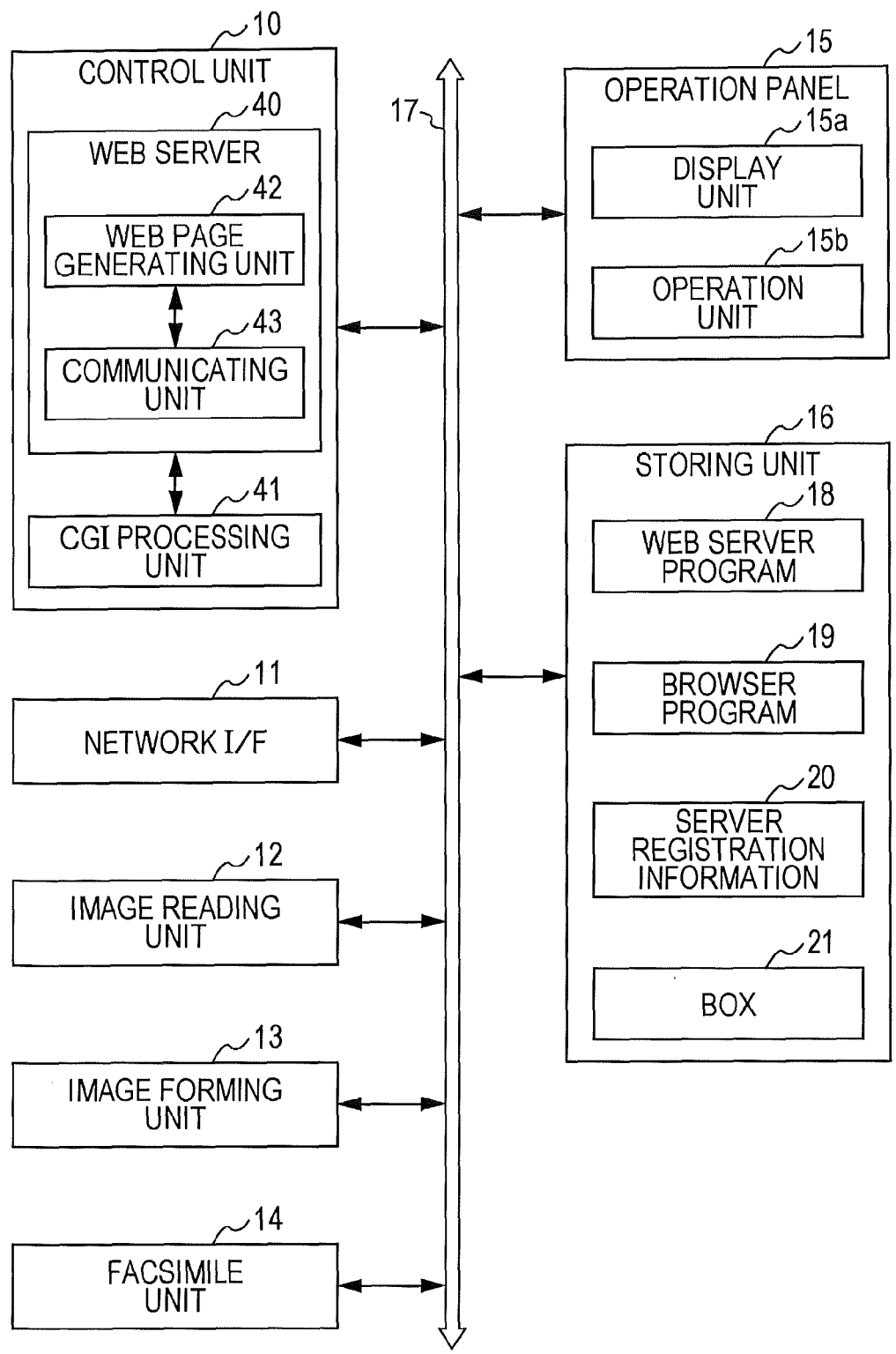
FIG. 2 is a view illustrating an example of a hardware configuration and a functional configuration of an image forming apparatus.

FIG. 2 is a view illustrating an example of a hardware configuration and a functional configuration of the image forming apparatus 2. The image forming apparatus 2 includes a control unit 10 containing a CPU and a memory, a network interface 11, an image reading unit 12, an image forming unit 13, a facsimile unit 14, an operation panel 15, and a storing unit 16. These units are connected with each other via a bus line 17 for mutual data input and output.

The network interface 11 connects the image forming apparatus 2 to the local network 4. The image reading unit 12 reads an image from a document set by the user. The image forming unit 13 forms an image based on various types of image data such as a document, and outputs printing. The facsimile unit 14 transmits and receives facsimile data via a not-shown public telephone line or the like.

The operation panel 15 includes a display unit 15a and an operation unit 15b. The display unit 15a constituted by a color liquid crystal display, for example, displays various types of information to the user using the image forming apparatus 2. The operation unit 15b receives operation input from the user using the image forming apparatus 2. The operation unit 15b is constituted by touch panel keys disposed on a display screen of the display unit 15a, push button keys disposed in the periphery of the display screen, and others.

The storing unit 16 is constituted by a hard disk drive (HDD), for example. A web server program 18 and the browser program 19 are stored in the storing unit 16 as programs executed by the control unit 10. Server registration information 20 is stored in the storing unit 16. The server registration information 20 registers information about the external server 6 beforehand as a destination and source of data transmission and reception by the image forming apparatus 2. The server registration information 20 is information which registers in advance a Uniform Resource Locator (URL) of the external server 6, and a server certificate retained by the external server 6, for example. The storing unit 16 further includes BOXes 21 used by the BOX function of the image forming apparatus 2. The BOXes 21 are storage areas for storing image data such as document data, and provided for each user or for each group.

The control unit 10 functions as a web server 40 and a Common Gateway Interface (CGI) processing unit 41 under the web server program 18 stored in the storing unit 16 and read and executed by the CPU of the control unit 10 in response to power supply to the image forming apparatus 2, for example.

The web server 40 functions as a first web server in the information processing system 1. The web server 40 includes a web page generating unit 42 and a communicating unit 43. The web page generating unit 42 generates a web page in Hyper Text Markup Language (HTML) format conforming to HTML5. The web page generated by the web page generating unit 42 includes various types of web content. The web content included in the web page contains script programs (hereinafter abbreviated as "script") corresponding to programs described in a script language and executable by a browser. The communicating unit 43 is a processing unit which relays communication between the web page generating unit 42 and a browser. The communicating unit 43 outputs a web page generated by the web page generating unit 42 to a browser, and receives data output from a browser.

The CGI processing unit 41 controls operations of respective units such as image reading unit 12 and the image forming unit 13 in linkage with the web server 40. When the web server 40 receives image data corresponding to a printing target via the network interface 11, for example, the CGI processing unit 41 acquires the image data received by the web server 40, and outputs the image data to the image forming unit 13 to output printing. Moreover, the CGI processing unit 41 is capable of storing data acquired by the web server 40 in the BOXes 21, outputting data stored in the BOXes 21 to the web server 40, and outputting image data generated based on a document read by the image reading unit 12 to the web server 40. Furthermore, when the web server 40 receives an update program for updating the web server program 18, the browser program 19, or the operating system of the image forming apparatus 2, the CGI processing unit 41 allows the control unit 10 to execute the received update program to update these programs to latest programs.

Figure 3:
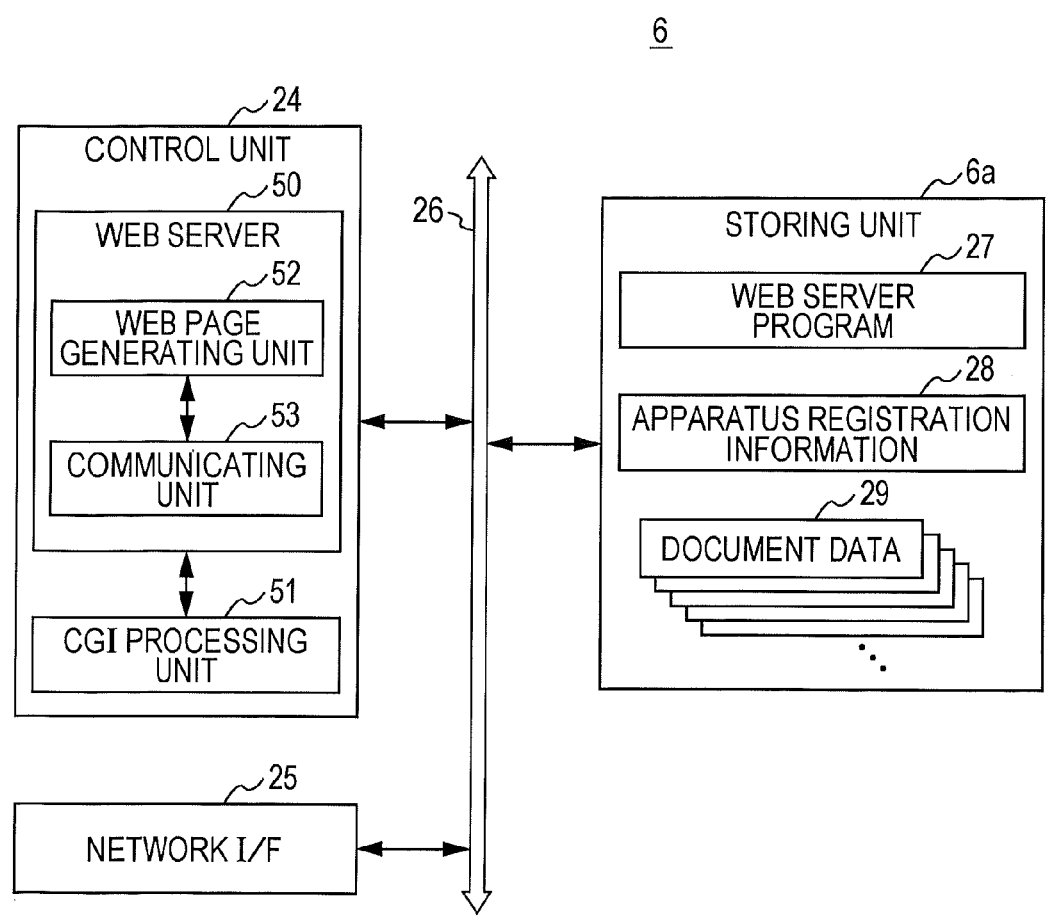
FIG. 3 is a view illustrating an example of a hardware configuration and a functional configuration of an external server.

FIG. 3 is a view illustrating an example of a hardware configuration and a functional configuration of the external server 6. The external server 6 includes a control unit 24 containing a CPU and a memory, a network interface 25, and the storing unit 6a. These units are connected with each other via a bus line 26 for mutual data input and output. The network interface 25 connects the external server 6 to the Internet to allow communication between the external server 6 and respective devices connected with the local network 4. The storing unit 6a stores various types of data 29 such as a document and an image uploaded via the Internet as noted above. The storing unit 6a also stores a web server program 27 and apparatus registration information 28. The apparatus registration information 28 registers beforehand information about the image forming apparatus 2 as a destination and source of data transmission and reception by the external server 6, such as a serial number and an IP address of the image forming apparatus 2 based on which the image forming apparatus 2 is identifiable.

The control unit 24 functions as a web server 50 and a CGI processing unit 51 under the web server program 27 stored in the storing unit 6a and read and executed by the CPU of the control unit 24 in response to power supply to the external server 6, for example.

The web server 50 functions as a second web server in the information processing system 1. The web server 50 includes a web page generating unit 52 and a communicating unit 53. Similarly to the web server 40 of the image forming apparatus 2, the web page generating unit 52 generates a web page in HTML format conforming to HTML5. The web page generated by the web page generating unit 52 includes various types of web content. The web content thus generated contains scripts corresponding to programs described in a script language and executable by a browser. The communicating unit 53 is a processing unit which relays communication between the web page generating unit 52 and a browser. The communicating unit 53 outputs the web page generated by the web page generating unit 52 to a browser, and receives data output from a browser.

The CGI processing unit 51 controls operations of respective units including the storing unit 6a in linkage with the web server 50. When the web server 50 receives a request for acquiring the data 29 stored in the storing unit 6a via the network interface 25, for example, the CGI processing unit 51 reads the requested data 29 from the storing unit 6a, and outputs the read data 29 to the web server 50. The CGI processing unit 51 is also capable of storing data in the storing unit 6a as uploaded data received by the web server 50.

Figure 4:
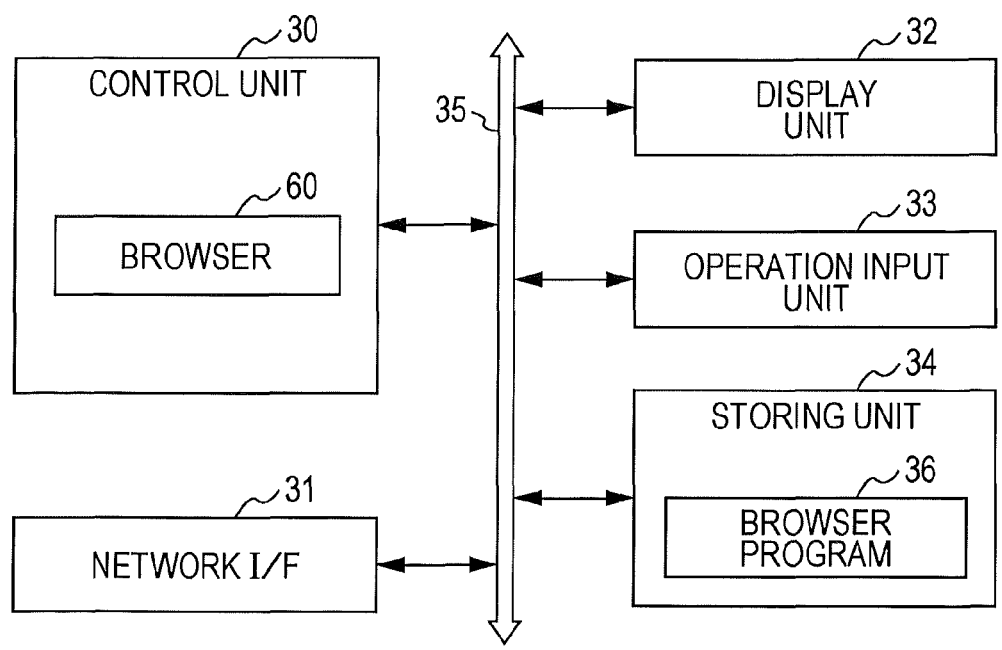
FIG. 4 is a view illustrating an example of a hardware configuration and a functional configuration of an information processing device.

FIG. 4 is a view illustrating an example of a hardware configuration and a functional configuration of the information processing device 3. The information processing device 3 includes a control unit 30 containing a CPU and a memory, a network interface 31, a display unit 32, an operation input unit 33, and a storing unit 34. These units are connected with each other via a bus line 35 for mutual data input and output. The network interface 31 connects the information processing device 3 to the local network 4 to allow communication between the information processing device 3 and the pair of the image forming apparatus 2 and the external server 6 via the local network 4. The display unit 32 constituted by a color liquid crystal display, for example, displays various types of information to the user. The operation input unit 33 constituted by touch panel keys, a keyboard, a mouse and others receives operation from the user. The storing unit 34 constituted by a hard disk drive (HDD) or a solid state drive (SSD), for example, stores various types of data, programs and others. According to the example illustrated in FIG. 4, the storing unit 34 stores a browser program 36 beforehand.

When the user issues an instruction for starting the browser program 36 by operating the operation input unit 33, the CPU of the control unit 30 reads the browser program 36 from the storing unit 34 and executes the browser program 36. As a result, the control unit 30 starts functioning as a browser 60. The browser 60 accesses an address (URL) designated by the user via the local network 4, and acquires a web page in HTML format from a web server at the corresponding address to display the web page on the display unit 32 as a browsing display. The browser 60 is capable of executing scripts contained in a web page conforming to HTML5.

Figure 5:
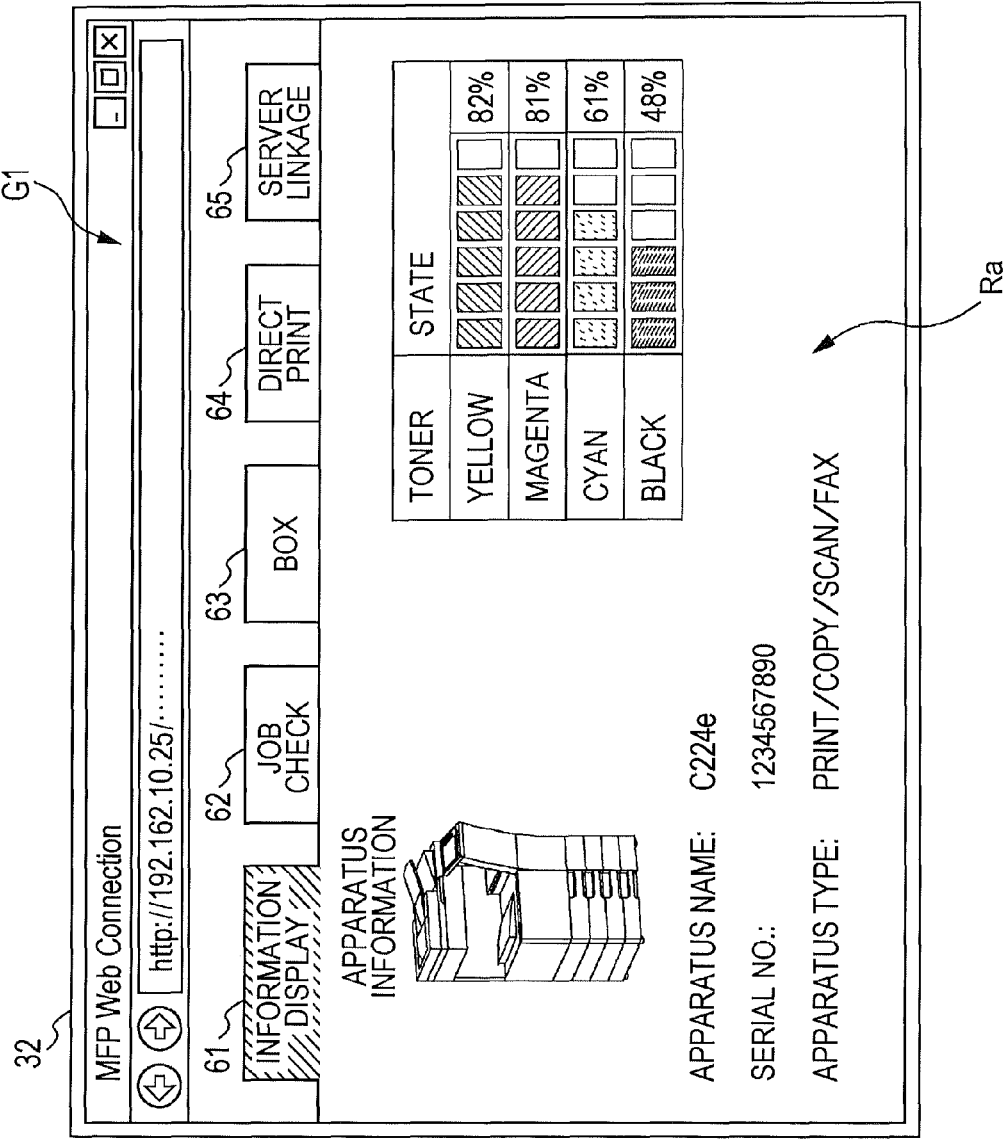
FIG. 5 is a view illustrating an example of a browsing screen displayed on a display unit by a browser.

When the user starts the browser 60 of the information processing device 3 to access the image forming apparatus 2, for example, the browser 60 acquires a web page from the web server 40 of the image forming apparatus 2 and displays a browsing screen corresponding to this web page on the display unit 32. FIG. 5 is a view illustrating an example of a browsing screen G1 displayed on the display unit 32 by the function of the browser 60 at this time. The browsing screen G1 has a screen structure corresponding to the web page acquired by the browser 60 from the web server 40 of the image forming apparatus 2, and contains at the center of the screen a content display area Ra for displaying a state of the image forming apparatus 2, or displaying web content as a user interface through which job submitting operation is issued to the image forming apparatus 2. The user is capable of switching the contents of the web content displayed in the content display area Ra by selecting one of a plurality of icon images 61, 62, 63, 64, and 65 displayed in the upper part of the content display area Ra. FIG. 5 illustrates an example of a state where the icon image 61 corresponding to "information display" has been selected, in which state a current toner residual amount of the image forming apparatus 2 is displayed in the content display area Ra, for example.

When the user desires to operate the image forming apparatus 2 and the external server 6 in linkage with each other via the browser 60 in the state where the browsing screen G1 illustrated in FIG. 5 has been displayed by the browser 60, the user performs operation for selecting the icon image 65 corresponding to "server linkage" from the plurality of icon images 61 through 65, for example. As a result, the browser 60 notifies the web server 40 of the image forming apparatus 2 about the selection of the "server linkage" by the user, and acquires a new web page for linkage with the web server 50 of the external server 6 from the web server 40 of the image forming apparatus 2.

Figure 6:
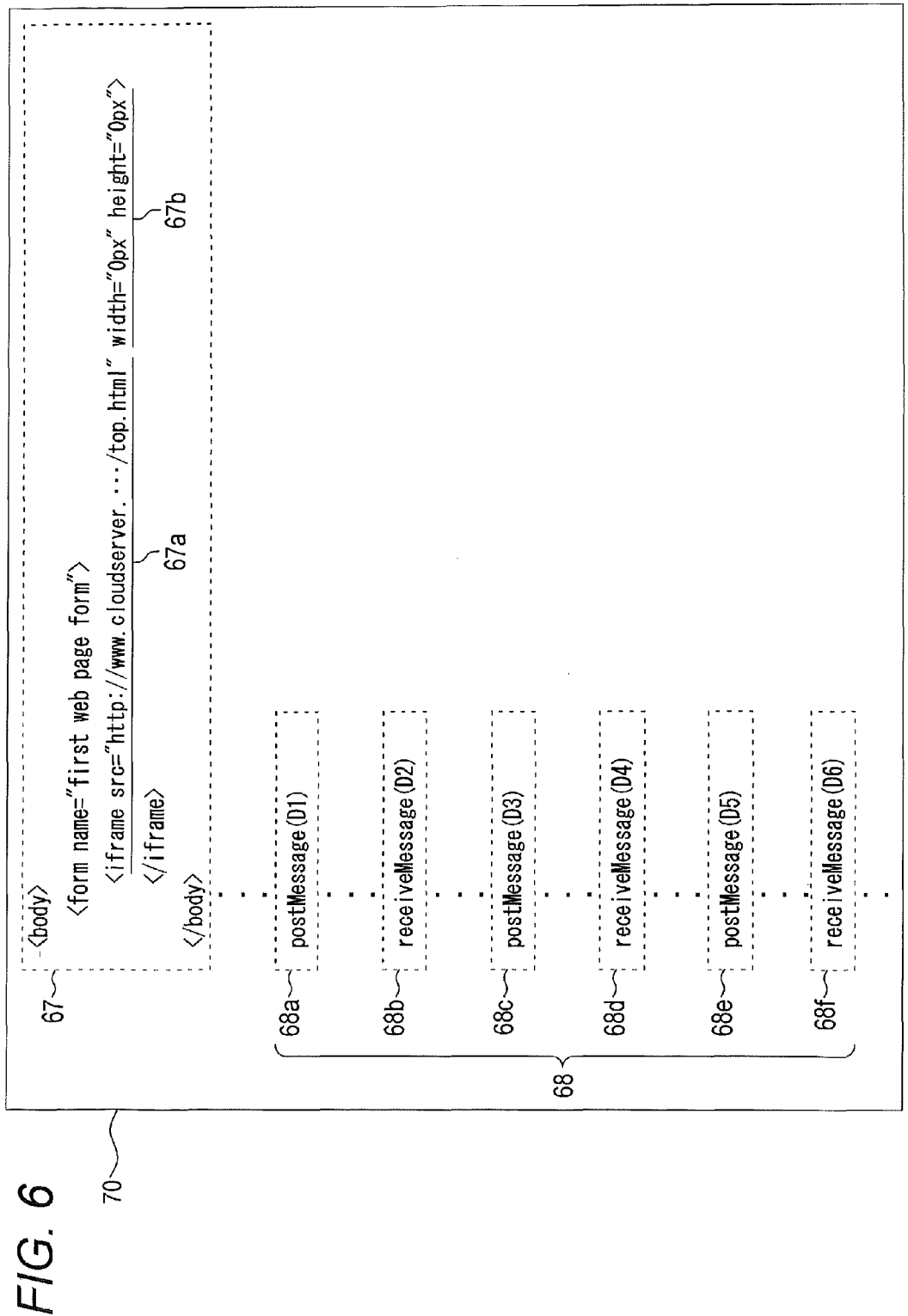
FIG. 6 is a view illustrating a concept of a first web page generated by a web server of the image forming apparatus.

As a web page for linkage with the web server 50 of the external server 6, the web server 40 of the image forming apparatus 2 generates a web page containing scripts executable by the browser 60. FIG. 6 is a view illustrating a concept of a web page (first web page) 70 described in HTML format and generated by the web server 40 of the image forming apparatus 2 at this time. The first web page 70 contains a script 67 which allows the browser 60 to access the external server 6 and acquire a second web page from the external server 6, and a script 68 which allows the browser 60 to transfer and obtain data to and from the second web page acquired from the external server 6.

The script 67 for acquiring the second web page from the external server 6 includes a command 67a which designates access to the URL of the external server 6 to open the second web page acquired from the URL as an inline frame (screen displayed in a part of the browsing screen G1), and a command 67b which designates the screen size of the inline frame at a pixel aspect ratio of zero. The URL of the external server 6 is described based on the information registered in the server registration information 20. The browser 60 having executed the script 67 accesses the external server 6 and acquires the second web page from the external server 6.

Figure 7:
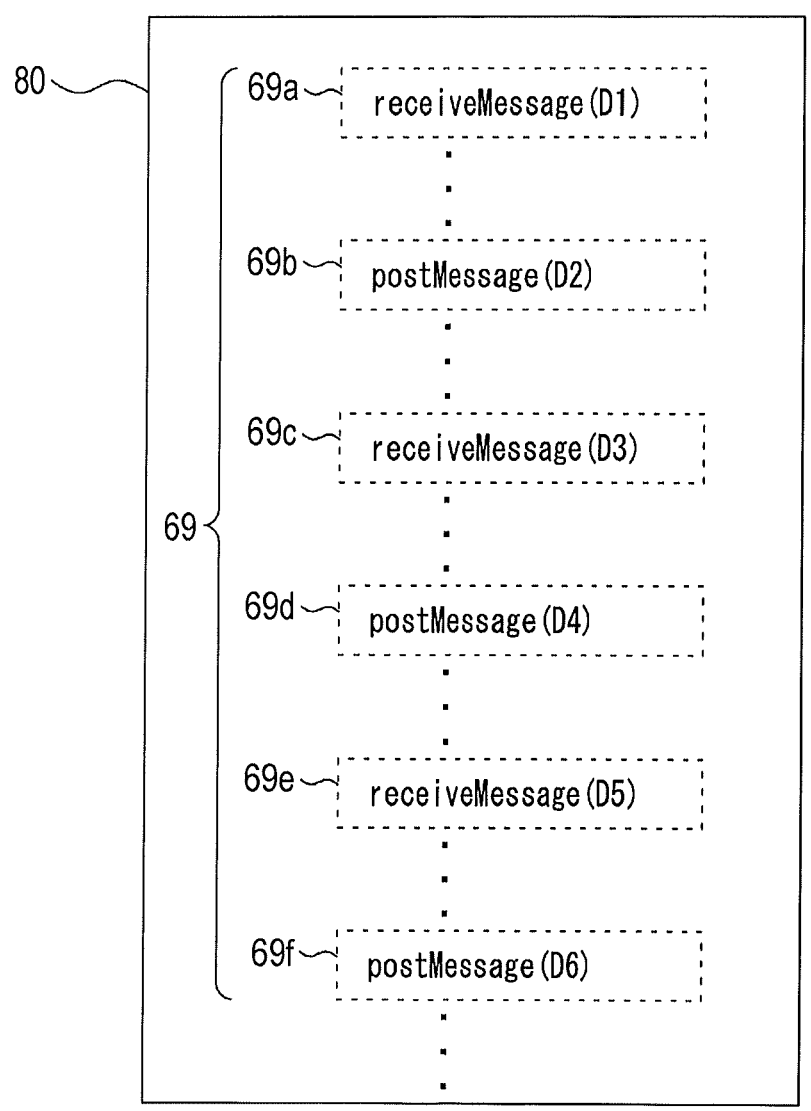
FIG. 7 is a view illustrating a concept of a second web page generated by a web server of the external server.

In generating a web page for linkage with the web server 40 of the image forming apparatus 2 in response to access from the browser 60, the web server 50 of the external server 6 generates a web page containing scripts executable by the browser 60. FIG. 7 is a view illustrating a concept of a web page (second web page) 80 described in HTML format and generated by the web server 50 of the external server 6 at this time. The second web page 80 contains a script 69 which allows the browser 60 to transfer and obtain data to and from the first web page 70 acquired from the image forming apparatus 2. When acquiring the second web page 80 illustrated in FIG. 7 from the external server 6, the browser 60 loads the second web page 80 to the memory of the control unit 30 to bring the script 69 into an executable state. However, in the condition that the screen size of the inline frame is designated to the pixel aspect ratio of zero, the second web page 80 acquired from the external server 6 is not displayed on the display unit 32.

The script 68 contained in the first web page 70 acquired from the web server 40 of the image forming apparatus 2 contains a plurality of scripts 68a through 68f for transferring and obtaining data to and from the second web page 80 acquired from the external server 6. Similarly, the script 69 contained in the second web page 80 acquired from the web server 50 of the external server 6 contains a plurality of scripts 69a through 69f for transferring and obtaining data to and from the first web page 70 acquired from the image forming apparatus 2. The scripts 68a through 68f and the scripts 69a through 69f are provided in one-to-one correspondence. A "postMessage (D1)" is a script for transferring data D1 to the opposite web page, while a "receiveMessage (D1)" is a script for obtaining the data D1 from the opposite web page. In this case, the browser 60 executes the postMessage script described in one of the web pages, and executes the receiveMessage script described in the other web page to transfer arbitrary data from the one web page to the other web page. These "postMessage" and "receiveMessage" scripts are scripts supported by HTML5, and not supported by HTML in previous versions before HTML5. Accordingly, in case of these scripts, data transfer has not been allowed between two web pages in HTML format prior to HTML5, as noted above. According to this embodiment, a configuration capable of achieving data transfer between two web pages is realized by the use of the scripts "postMessage" and "receiveMessage" supported by HTML5. However, the method for realizing data transfer between two web pages is not limited to the method using the scripts "postMessage" and "receiveMessage" in HTML5, but may be other methods as long as the browser 60 achieves data transfer between two web pages.

Each of the first and second web pages 70 and 80 further includes various scripts in addition to the scripts 67, 68, and 69 discussed above. For example, the first web page 70 contains a script for transmitting data to the image forming apparatus 2 as data received from the second web page 80, and a script for acquiring data from the image forming apparatus 2 as data to be transferred to the second web page 80. Similarly, the second web page 80 contains a script for transmitting data to the external server 6 as data received from the first web page 70, and a script for acquiring data from the external server 6 as data to be transferred to the first web page 70, for example.

Figure 8:
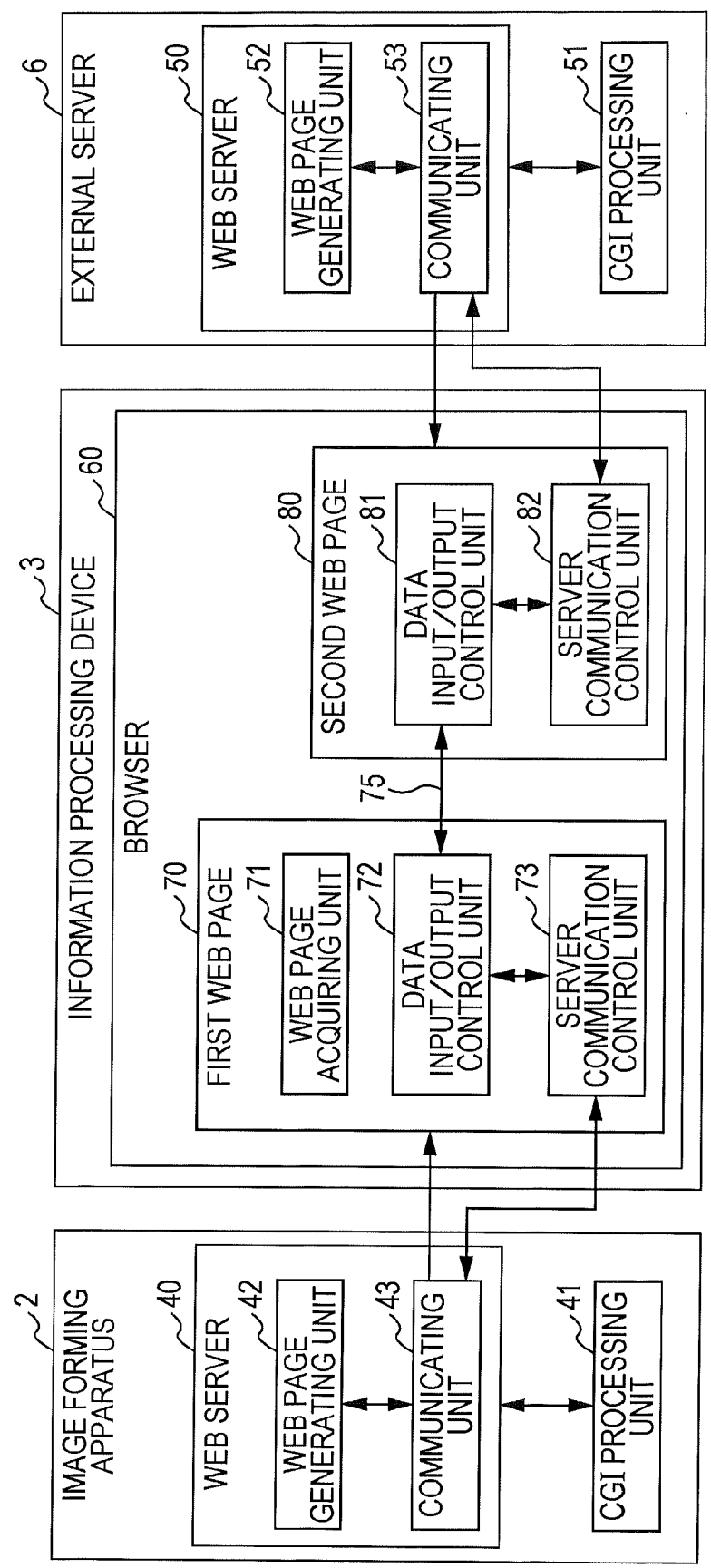
FIG. 8 is a view illustrating an example of a functional configuration of the browser.

Discussed hereinbelow are functional configurations realized when the browser 60 executes the scripts contained in the first and second web pages 70 and 80 acquired from the image forming apparatus 2 and the external server 6, respectively. FIG. 8 is a view illustrating an example of a functional configuration of the browser 60. The browser 60 functions as a web page acquiring unit 71, a data input/output control unit 72, and a server communication control unit 73 by executing the scripts contained in the first web page 70 acquired from the web server 40 of the image forming apparatus 2. According to this structure, the web server 40 of the image forming apparatus 2 allows the browser 60 to function as the web page acquiring unit 71, the data input/output control unit 72, and the server communication control unit 73 by generating the first web page 70 containing the scripts executable by the browser 60 and outputting the generated first web page 70 to the browser 60.

The web page acquiring unit 71 is a processing unit which accesses the external server 6 and acquires the second web page 80 from the external server 6. The browser 60 allows functioning of the web page acquiring unit 71 by executing the script 67 described in the first web page 70 to acquire the second web page 80 from the external server 6.

The browser 60 functions as a data input/output control unit 81 and a server communication control unit 82 by executing the scripts contained in the second web page 80 acquired from the web server 50 of the external server 6. According to this structure, the web server 50 of the external server 6 allows the browser 60 to function as the data input/output control unit 81 and the server communication control unit 82 by generating the second web page 80 containing the scripts executable by the browser 60 and outputting the generated second web page 80 to the browser 60.

When both the first and second web pages 70 and 80 are loaded into the memory by the browser 60, the browser 60 allows linkage operation between the data input/output control unit 72 of the first web page 70 and the data input/output control unit 81 of the second web page 80 for mutual data transfer between the first web page 70 and the second web page 80. In other words, the data input/output control unit 72 is a processing unit which functions in response to execution of the script 68 contained in the first web page 70 and executed by the browser 60, while the data input/output control unit 81 is a processing unit which functions in response to execution of the script 69 contained in the second web page 80 and executed by the browser 60. The data input/output control units 72 and 81 allow data transmission 75 from the first web page 70 to the second web page 80 or from the second web page 80 to the first web page 70 by mutual linkage operation between the data input/output control units 72 and 81.

The server communication control unit 73 of the first web page 70 allowed to function by the browser 60 transmits and receives data to and from the web server 40 of the image forming apparatus 2 as data transferred and obtained between the data input/output control unit 72 and the data input/output control unit 81 of the second web page 80. The server communication control unit 82 of the second web page 80 allowed to function by the browser 60 transmits and receives data to and from the web server 50 of the external server 6 as data transferred and obtained between the data input/output control unit 81 and the data input/output control unit 72 of the first web page 70. Accordingly, the image forming apparatus 2 and the external server 6 are allowed to exchange necessary data via the browser 60 functioning in the information processing device 3.

Figure 10A:
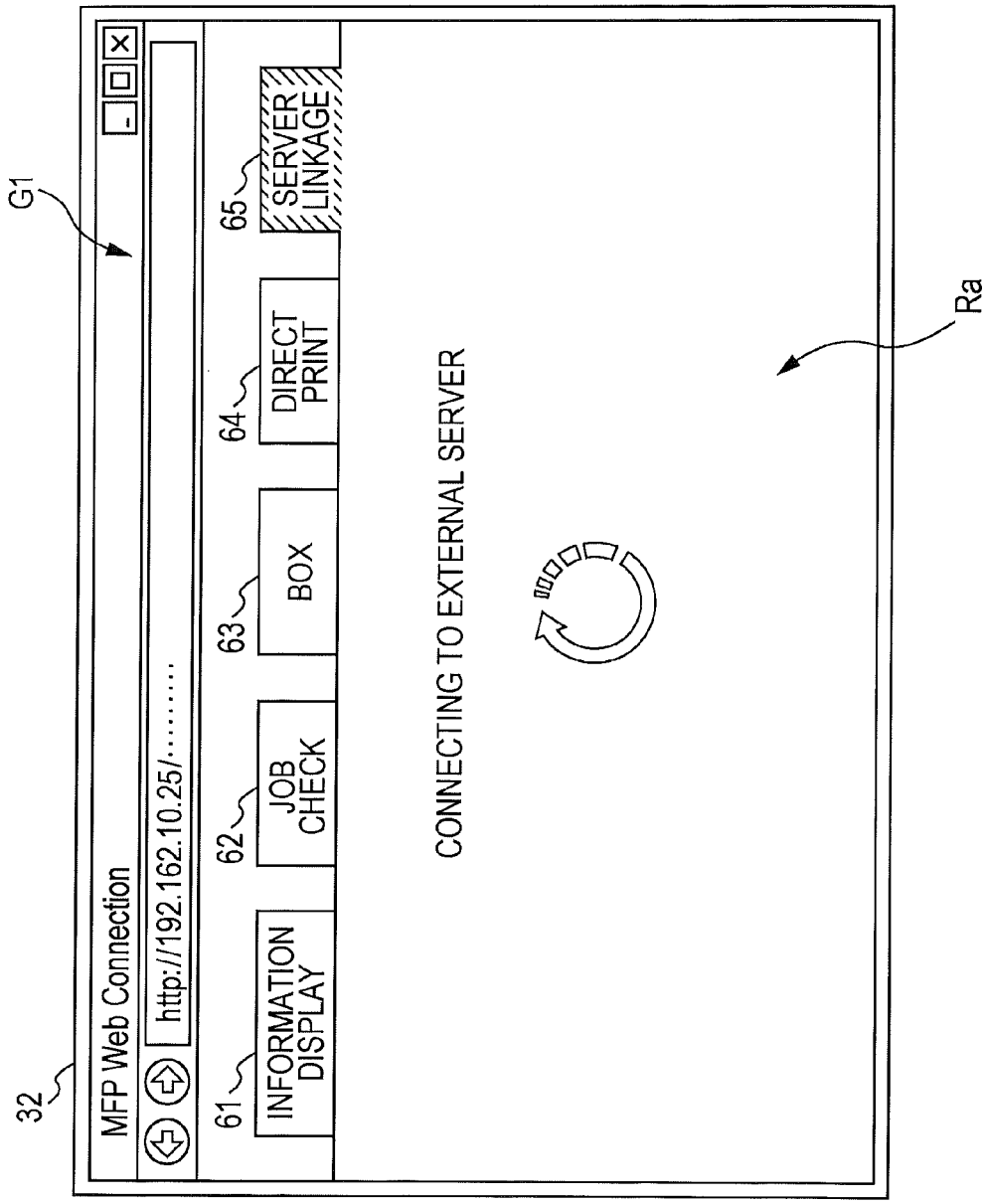
FIGS. 10A and 10B are views illustrating switching of a browsing screen displayed by the browser.

FIG. 9 is a view illustrating operation processes executed when data accumulated in the external server 6 is submitted to the image forming apparatus 2 as job data. Initially, the user starts the browser 60 of the information processing device 3, and allows the browser 60 to access the web server 40 of the image forming apparatus 2 to display the browsing screen G1 illustrated in FIG. 5 on the display unit 32 of the information processing device 3. When the user inputs server linkage operation to the browsing screen G1 (process P1), the browser 60 transmits a server linkage instruction to the web server 40 of the image forming apparatus 2 (process P2). The web server 40 of the image forming apparatus 2 generates the first web page 70 for linkage with the external server 6 in response to the server linkage instruction issued from the browser 60, and outputs the generated first web page 70 to the browser 60 (process P3). The browser 60 having received the first web page 70 loads the first web page 70 into the memory to start execution of the scripts contained in the first web page 70. In addition, the browser 60 having received the first web page 70 updates the browsing screen G1 displayed on the display unit 32 from a state illustrated in FIG. 5 to a state illustrated in FIG. 10A, for example. An image displayed in the content display area Ra on the browsing screen G1 illustrated in FIG. 10A is an image contained in the first web page 70 as web content.

The browser 60 having started execution of the scripts contained in the first web page 70 initially allows functioning the web page acquiring unit 71 to transmit a web page acquisition request to the external server 6 (process P4). At this time, the web page acquiring unit 71 transmits the web page acquisition request to which identification information about the image forming apparatus 2, such as a serial number, has been attached. The external server 6 having received the web page acquisition request from the browser 60 authenticates whether or not the image forming apparatus 2 has been registered in the apparatus registration information 28 beforehand for linkage operation based on the identification information such as a serial number. When it is determined that the operation is linkage operation with the image forming apparatus 2 registered in the apparatus registration information 28, the web server 50 of the external server 6 generates the second web page 80 for linkage with the image forming apparatus 2, and transmits the generated second web page 80 to the browser 60 (process P5). When the identification information such as a serial number is not registered in the apparatus registration information 28, the web server 50 of the external server 6 transmits not the second web page 80 for linkage with the image forming apparatus 2, but an error page or the like to the browser 60 to prohibit execution of the subsequent processes.

The browser 60 having received the second web page 80 from the external server 6 loads the second web page 80 into the memory, and starts execution of the scripts contained in the second web page 80. The browser 60 having started execution of the scripts contained in the second web page 80 initially allows functioning of the server communication control unit 82 to acquire a server certificate retained by the external server 6 (process P6). Then, the browser 60 allows functioning of the data input/output control unit 81 of the second web page 80, and the data input/output control unit 72 of the first web page 70, and transfers the server certificate acquired from the external server 6 to the data input/output control unit 72 of the first web page 70 from the data input/output control unit 81 of the second web page 80 (process P7). Subsequently, the browser 60 allows functioning of the server communication control unit 73 of the first web page 70 to transmit the server certificate acquired by the data input/output control unit 72 to the web server 40 of the image forming apparatus 2 (process P8).

When the web server 40 of the image forming apparatus 2 receives the server certificate, the CGI processing unit 41 starts functioning. The CGI processing unit 41 checks whether or not the server certificate received by the web server 40 agrees with a certificate registered in the server registration information 20. When the received server certificate agrees with the certificate of the external server 6 registered in the server registration information 20, the CGI processing unit 41 notifies the web server 40 about completion of certificate checking. In response to this notification, the web server 40 notifies the server communication control unit 73 of the first web page 70 about completion of certificate checking (process P9). When the server communication control unit 73 receives the notification of completion of certificate checking, the browser 60 executes the subsequent scripts described in the first web page 70. When the server certificate does not agree with the certificate registered in the server registration information 20 beforehand, an error notification is transmitted from the web server 40 of the image forming apparatus 2 to the browser 60. In this case, the subsequent processes are not executed by the browser 60.

The browser 60 having received the notification of completion of certificate checking allows functioning of the data input/output control unit 72 of the first web page 70 and the data input/output control unit 81 of the second web page 80 to output a job list request to the data input/output control unit 81 of the second web page 80 from the data input/output control unit 72 of the first web page 70 (process P10). Then, the browser 60 allows functioning of the server communication control unit 82 of the second web page 80 to transmit the job list request obtained by the data input/output control unit 81 to the external server 6 (process P11). The external server 6 having received the job list request from the browser 60 generates a job list (data list) listing the data 29 such as documents, images and the like accumulated in the storing unit 6a, and transmits the generated job list to the browser 60 (process P12). In this case, it is preferable that the external server 6 extracts only the data 29 accessible by the user of the information processing device 3, and generates the job list of the extracted data.

Figure 10B:
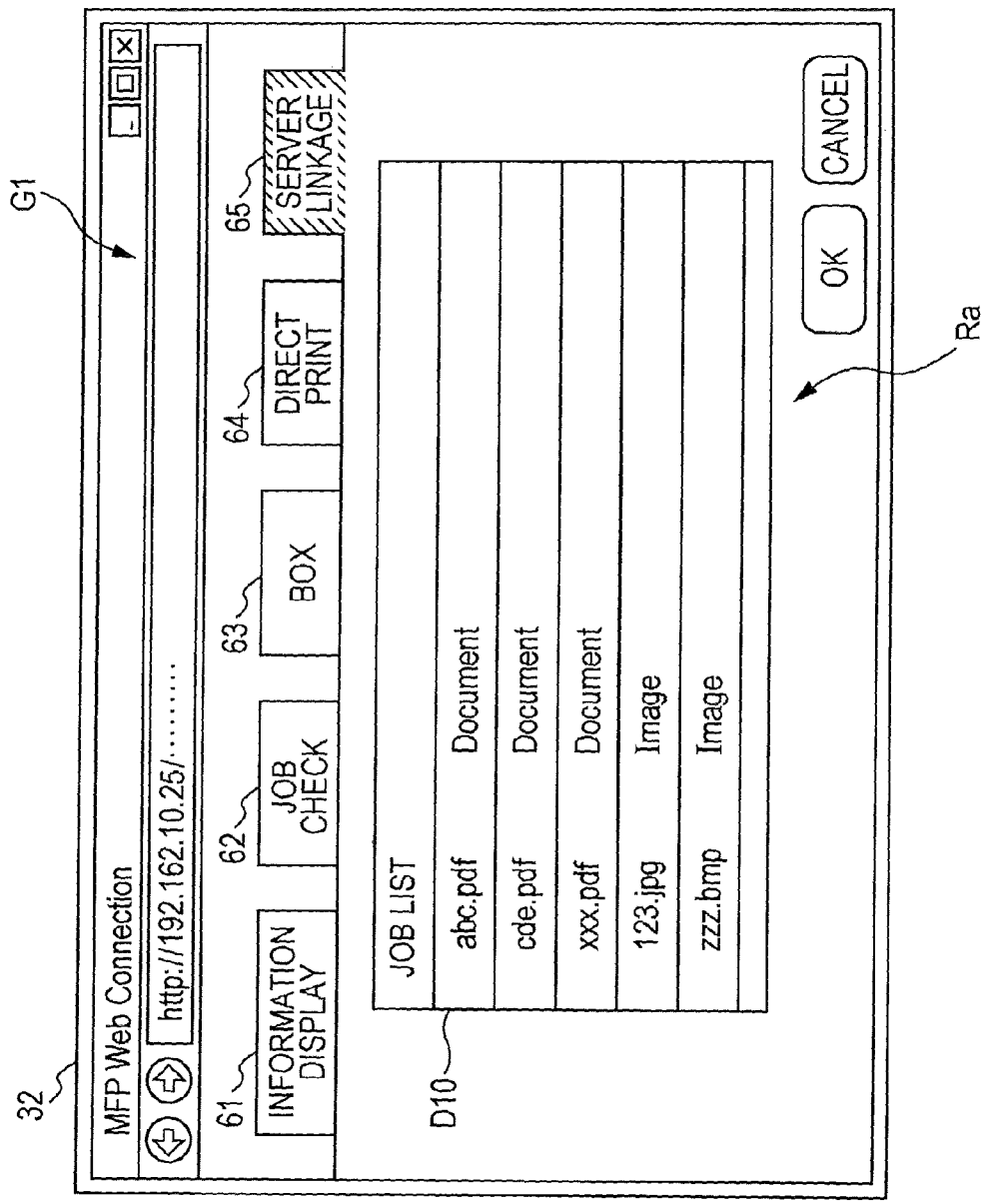

When the server communication control unit 82 of the second web page 80 receives the job list from the external server 6, the browser 60 allows functioning of the data input/output control unit 81 of the second web page 80 and the data input/output control unit 72 of the first web page 70 to transfer the job list acquired from the external server 6 to the data input/output control unit 72 of the first web page 70 from the data input/output control unit 81 of the second web page 80 (process P13). Then, the browser 60 displays the job list acquired by the data input/output control unit 72 of the first web page 70 (process P14). As a result, the browsing screen G1 displayed on the display unit 32 switches from the state illustrated in FIG. 10A to a state illustrated in FIG. 10B. A job list D10 displayed in the content display area Ra on the browsing screen G1 illustrated in FIG. 10B is a list corresponding to the job list acquired by the data input/output control unit 72 and displayed as web content of the first web page 70. In switching the screen from the state illustrated in FIG. 10A to the state illustrated in FIG. 10B, the server communication control unit 73 may temporarily transmit the job list acquired by the data input/output control unit 72 to the web server 40 of the image forming apparatus 2 to acquire a new web page containing the job list from the web server 40 and update the browsing screen G1 from the state illustrated in FIG. 10A to the state illustrated in FIG. 10B. The job list D10 acquired from the external server 6 is appropriately displayed in this manner even in the condition not displaying a browsing screen corresponding to the second web page 80.

The browser 60 having displayed the job list D10 on the browsing screen G1, which is under display in correspondence with the first web page 70, receives input of job selection operation from the user. When at least one data is selected by the user from the plurality of data 29 contained in the job list D10 on the browsing screen G1 (process P15), the browser 60 allows functioning of the data input/output control unit 72 of the first web page 70, and the data input/output control unit 81 of the second web page 80 to output a job request for the data selected by the user to the data input/output control unit 81 of the second web page 80 from the data input/output control unit 72 of the first web page 70 (process P16). Then, the browser 60 allows functioning of the server communication control unit 82 of the second web page 80 to transmit the job request acquired by the data input/output control unit 81 to the external server 6 (process P17). The external server 6 having received the job request from the browser 60 reads the data 29 selected by the user from the data 29 accumulated in the storing unit 6a, and transmits the read data 29 to the browser 60 as job data (process P18). In this case, the external server 6 may convert the data 29 selected by the user into image data formable into an image by the image forming apparatus 2, and transmit the converted image data to the browser 60 as job data.

When the server communication control unit 82 of the second web page 80 receives the job data from the external server 6, the browser 60 allows functioning of the data input/output control unit 81 of the second web page 80 and the data input/output control unit 72 of the first web page 70 to transfer the job data acquired from the external server 6 to the data input/output control unit 72 of the first web page 70 from the data input/output control unit 81 of the second web page 80 (process P19). Then, the browser 60 allows functioning of the server communication control unit 73 of the first web page 70 to transmit the job data acquired by the data input/output control unit 72 to the image forming apparatus 2 (process P20). As a result, the image forming apparatus 2 is allowed to acquire the data 29 stored in the external server 6 via the browser 60.

The web server 40 of the image forming apparatus 2 having received the job data from the browser 60 outputs the job data to the image forming unit 13 via the CGI processing unit 41, and starts execution of a job for forming an image corresponding to the job data (process P21). In other words, the image forming apparatus 2 outputs printing based on the data 29 selected by the user.

As described above, the web server 40 of the image forming apparatus 2 and the web server 50 of the external server 6 generate the first and second web pages 70 and 80, respectively, incorporating the scripts executable by the browser 60, and allow the browser 60 to execute these scripts to achieve data transmission and reception between the image forming apparatus 2 and the external server 6 via the browser 60. In this data transmission and reception, the user is only required to start the browser 60 of the information processing device 3 and input server linkage operation, and thereafter perform operation for selecting the desired data 29 from the job list displayed on the browsing screen G1 on the display unit 32 to transfer the data 29 from the external server 6 to the image forming apparatus 2. In this case, the user need not start an application of the information processing device 3 other than the browser 60, wherefore the degree of operability considerably improves.

Figure 11:
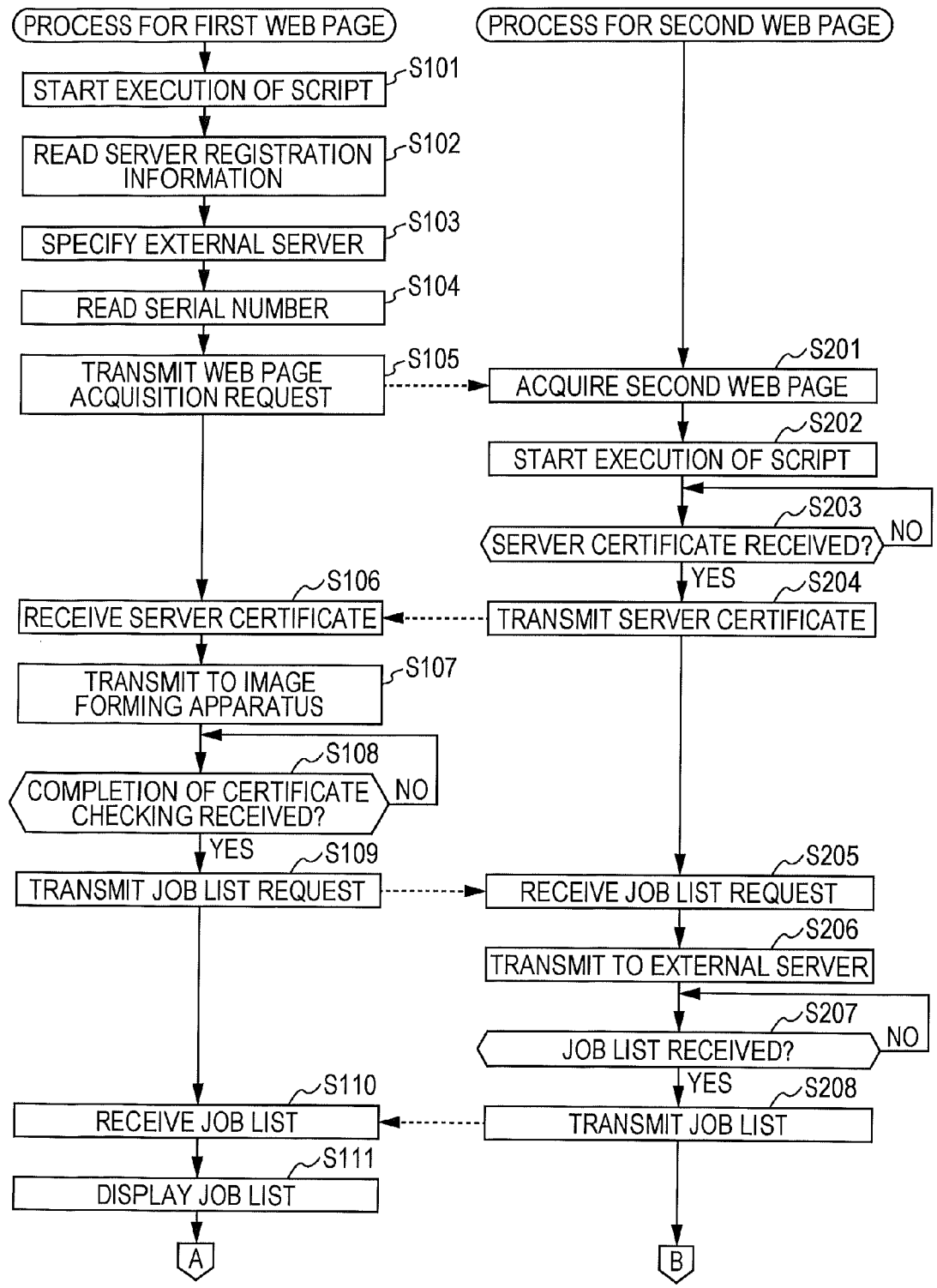
FIG. 11 is a flowchart showing an example of processing procedures performed when the browser executes scripts of the first and second web pages.
Figure 12:
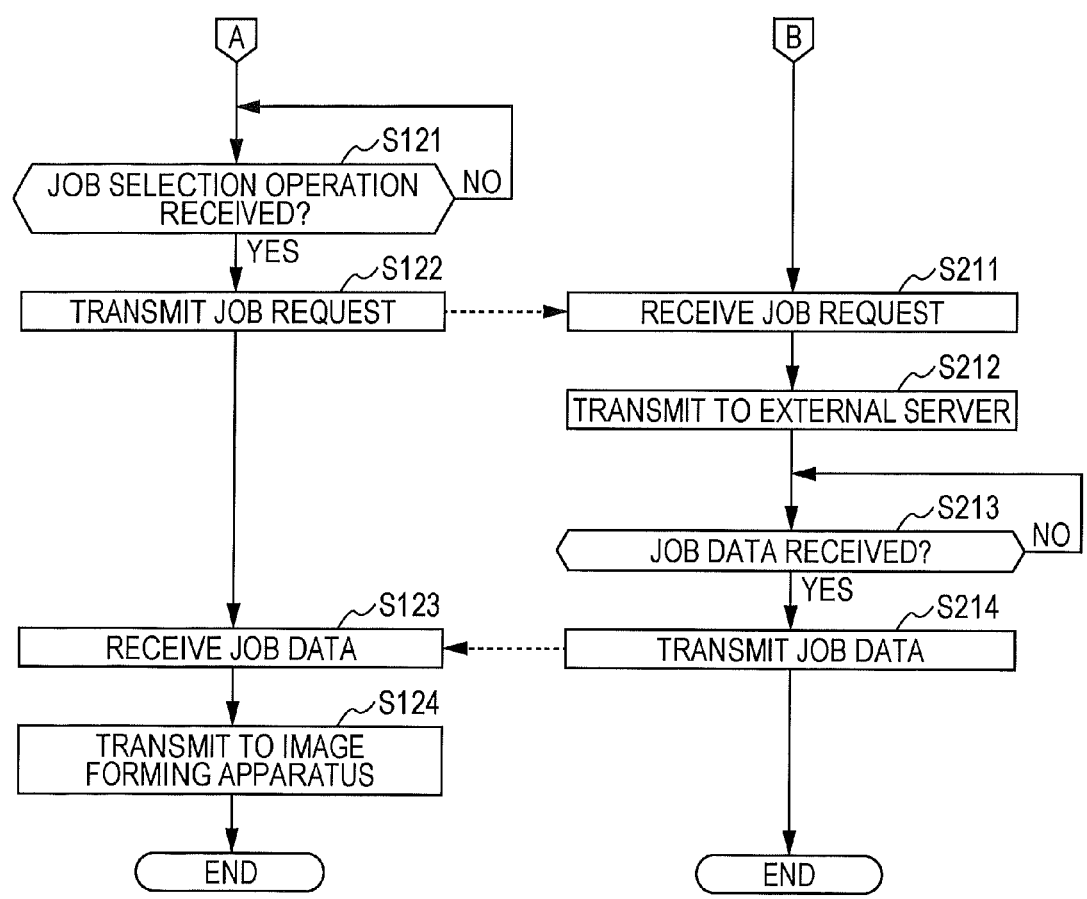
FIG. 12 is a flowchart showing an example of processing procedures performed when the browser executes the scripts of the first and second web pages.

Discussed hereinbelow is an example of processing procedures performed by the browser 60 when the browser 60 executes the scripts contained in the first and second web pages 70 and 80 for data transfer. FIGS. 11 and 12 are flowcharts showing an example of the procedures performed by the browser 60. As shown in FIGS. 11 and 12, the browser 60 performs a process for the first web page 70 and a process for the second web page 80 in parallel with the opposite process. Initially, the browser 60 acquires the first web page 70 from the web server 40 of the image forming apparatus 2 to start execution of the scripts contained in the first web page 70 (step S101), as can be seen from FIG. 11. With the start of these scripts, the browser 60 reads the server registration information 20 (step S102), and specifies the external server 6 corresponding to the destination and source of data transmission and reception (step S103). When a plurality of the external servers 6 are registered in the server registration information 20, the browser 60 urges the user to perform selection operation to specify the external server 6 selected by the user as the destination and source. Then, the browser 60 reads identification information about the image forming apparatus 2, such as a serial number, which information is contained in the first web page 70 acquired by the web server 40 of the image forming apparatus 2 (step S104). Subsequently, the browser 60 transmits a web page acquisition request, to which the identification information has been attached, to the external server 6 (step S105). The identification information about the image forming apparatus 2 is transmitted to allow the external server 6 to recognize the image forming apparatus 2 as an access source. In other words, the external server 6 authenticates the image forming apparatus 2 as the access source by receiving the identification information about the image forming apparatus 2. When the authentication is successful, the external server 6 permits message exchange with the image forming apparatus 2 via the browser 60, and transmits the second web page 80 to the browser 60. As a result, the browser 60 acquires the second web page 80 from the external server 6 (step S201), and starts execution of the scripts contained in the second web page 80 (step S202).

The browser 60 having executed the scripts contained in the second web page 80 initially waits until reception of a server certificate from the external server 6 (step S203). When receiving the server certificate (YES in step S203), the browser 60 outputs the received server certificate to the first web page 70 from the second web page 80 (step S204). When the first web page 70 acquires the server certificate (step S106), the browser 60 transmits the server certificate to the image forming apparatus 2 (step S107). Then, the browser 60 waits until reception of a notification of completion of certificate checking from the image forming apparatus 2 (step S108). When receiving the notification of completion of certificate checking (YES in step S108), the browser 60 transmits a job list request to the second web page 80 from the first web page 70 (step S109). When the second web page 80 receives the job list request (step S205), the browser 60 transmits the job list request to the external server 6 (step S206).

Then, the browser 60 waits until the second web page 80 receives the job list from the external server 6 (step S207). When receiving the job list (YES in step S207), the browser 60 outputs the received job list to the first web page 70 from the second web page 80 (step S208). When the first web page 70 receives the job list (step S110), the browser 60 handles the job list as web content of the first web page 70, and displays the job list in the content display area Ra on the browsing screen G1 displayed on the display unit 32 (step S111).

Proceeding to FIG. 12, the browser 60 waits until reception of job selection operation from the user (step S121). When receiving the job selection operation from the user (YES in step S121), the browser 60 transmits a job request to the second web page 80 from the first web page 70 (step S122). When the second web page 80 receives the job request (step S211), the browser 60 transmits the job request to the external server 6 (step S212). Then, the browser 60 waits until the second web page 80 receives job data from the external server 6 (step S213). When receiving the job data (YES in step S213), the browser 60 outputs the received job data to the first web page 70 from the second web page 80 (step S214). When the first web page 70 receives the job data (step S123), the browser 60 transmits the job data to the image forming apparatus 2 (step S124).

The foregoing processes performed by the browser 60 allow the image forming apparatus 2 to acquire job data from the external server 6, and execute jobs such as image formation. In the flowcharts discussed above, the process for the first web page 70 is a process performed when the browser 60 executes the scripts incorporated in the first web page 70 acquired from the web server 40 of the image forming apparatus 2. On the other hand, the process for the second web page 80 is a process performed when the browser 60 executes the scripts incorporated in the second web page 80 acquired from the web server 50 of the external server 6. Accordingly, the web server 40 of the image forming apparatus 2 and the web server 50 of the external server 6 achieve mutual data transmission and reception, not with the necessity of intervention of another application or the like, but only with intervention of the browser 60, by generating the web pages 70 and 80 incorporating the scripts for executing the foregoing processes, and outputting the generated web pages 70 and 80 to the browser 60.

Figure 13A:
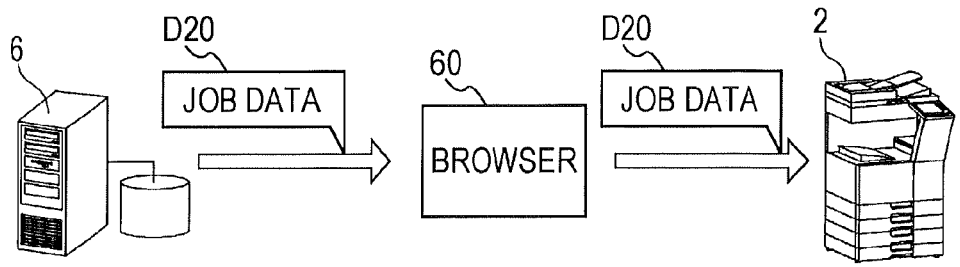
FIGS. 13A through 13C are views illustrating an example of data transmission and reception between the external server and the image forming apparatus via the browser.
Figure 13B:
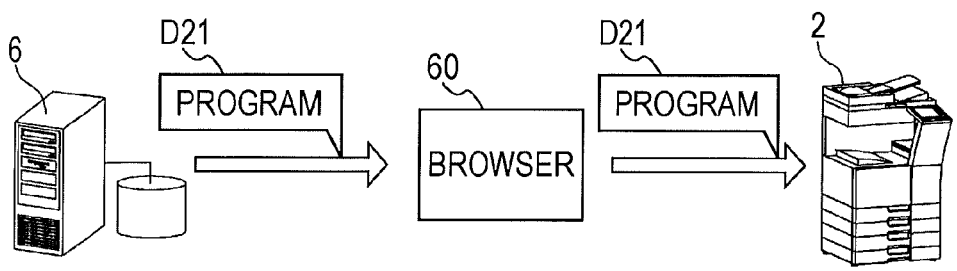
Figure 13C:
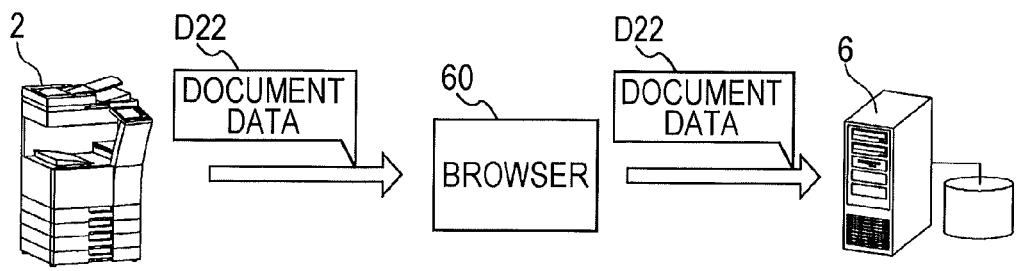

FIGS. 13A through 13C are views illustrating an example of data transmission and reception between the external server 6 and the image forming apparatus 2 via the browser 60. FIG. 13A illustrates an example of job data D20 transmitted from the external server 6 and received by the image forming apparatus 2 via the browser 60 as noted above. Data transmitted from the external server 6 is not limited to the job data D20, but may be other data such as data on a document and an image. For example, the data may be setting data for changing settings of the image forming apparatus 2.

Alternatively, as illustrated in FIG. 13B, a program D21 may be transmitted from the external server 6 to the image forming apparatus 2. For example, the update program D21 for updating the operating system of the image forming apparatus 2, as basic software of the image forming apparatus 2, for example, to the latest version may be transmitted from the external server 6 to the image forming apparatus 2 via the browser 60.

While transmission of data from the external server 6 to the image forming apparatus 2 have been presented herein as examples, data transmission and reception is not limited to these examples. More specifically, as illustrated in FIG. 13C, document data D22 or the like may be transmitted from the image forming apparatus 2 to the external server 6. Accordingly, the image forming apparatus 2 is capable of uploading image data generated based on a document read by the image reading unit 12, or document data stored in the BOXes 21, for example, to the external server 6 via the browser 60.

According to the information processing system 1 in this embodiment, the first web server 40 provided on the image forming apparatus 2, and the second web server 50 provided on the external server 6 are allowed to transmit and receive data between each other via the browser 60 started by the information processing device 3. More specifically, the first web server 40 allows the browser 60 to execute the scripts contained in the first web page 70. As a result, the browser 60 functions as the web page acquiring unit 71 for acquiring the second web page 80 from the second web server 50, the data input/output control unit 72 for transferring and obtaining data to and from the data input/output control unit 81 functioning when the browser 60 executes the scripts contained in the second web page 80 acquired by the web page acquiring unit 71, and the server communication control unit 73 for transmitting and receiving data to and from the first web server 40 as data transferred and obtained between the data input/output control unit 72 and the data input/output control unit 81. On the other hand, the second web server 50 allows the browser 60 to execute the scripts contained in the second web page 80. As a result, the browser 60 functions as the data input/output control unit 81 for transferring and obtaining data to and from the data input/output control unit 72 of the first web page 70, and the server communication control unit 82 for transmitting and receiving data to and from the second web server 50 as data transferred and obtained between the data input/output control unit 81 and the data input/output control unit 72. This structure allows the first web server 40 and the second web server 50 to transmit and receive data to and from the opposite server via the browser 60.

According to the information processing system 1 having the foregoing structure, the user is only required to operate the browser 60 to achieve desired data transmission and reception between the first web server 40 and the second web server 50. Accordingly, the necessary operation becomes simpler, and the efficiency of data transmission and reception improves. Moreover, the foregoing structure eliminates the necessity of additionally equipping a relay server as required in the conventional image formation support device, wherefore reduction of the cost for data transmission and reception is achievable in comparison with the conventional technology.

According to the information processing system 1 in this embodiment, the browser 60 displays the browsing screen G1 corresponding to the first web page 70 when the first web server 40 outputs the first web page 70 to the browser 60. On the other hand, the browser 60 does not display a browsing screen corresponding to the second web page 80 when the web page acquiring unit 71 acquires the second web page 80. According to this structure, the user is only required to operate the single browsing screen G1 displayed on the display unit 32, wherefore the operability considerably improves. When the browsing screen corresponding to the second web page 80 is displayed on the display unit 32, it is not easy for the user to determine which of the browsing screen G1 corresponding to the first web page 70 and the browsing screen corresponding to the second web page 80 is to be operated. In this case, erroneous operation or duplicate operation may be performed. According to this embodiment, however, the browsing screen corresponding to the second web page 80 is not displayed, wherefore neither erroneous operation nor duplicate operation may be performed in this condition.

According to this embodiment, each of the first web server 40 and the second web server 50 checks whether or not the opposite server has been registered beforehand prior to start of data transmission and reception by the first web server 40 and the second web server 50 via the browser 60. Each of the first web server 40 and the second web server 50 starts data transmission and reception after confirming that the opposite server has been registered beforehand. According to this structure, neither the first web server 40 nor the second web server 50 transmits and receives data to and from an unauthorized web server not registered beforehand, wherefore a high-security system is realizable.

MODIFIED EXAMPLE

While a specific embodiment according the present invention has been described herein, the present invention is not limited to the respective examples discussed in this embodiment. Modifications and changes in various manners, including the followings, may be made.

According to this embodiment, for example, the browser 60 is started by the information processing device 3 provided separately from the image forming apparatus 2 and the external server 6. However, the information processing device 3 starting the browser 60 is not limited to a device provided separately from the image forming apparatus 2 and the external server 6. For example, the browser program 19 is installed in the image forming apparatus 2 as noted above. The browser program 19 may be executed by the image forming apparatus 2 to allow the browser 60 to function within the image forming apparatus 2. In this case, the image forming apparatus 2 also functioning as the foregoing information processing device 3 is capable of directly transmitting and receiving data to and from the external server 6 via the browser 60 functioning within the image forming apparatus 2.

According to this embodiment, the user performs data selection operation for selecting data as a transfer target from the job list (data list) acquired from the external server. However, this selection operation by the user is not necessarily required. For example, the browser 60 may collectively transmit, to the image forming apparatus 2, all the data 29 accessible from the user in the data 29 accumulated in the external server 6 when the scripts of the first and second web pages 70 and 80 of the browser 60 start data transmission from the external server 6 to the image forming apparatus 2 in linkage with each other.

According to this embodiment, the browser 60 started by the user initially accesses the web server 40 of the image forming apparatus 2 to acquire the first web page 70 from the web server 40 of the image forming apparatus 2. Conversely, the browser 60 started by the user may initially access the web server 50 of the external server 6 to acquire the first web page 70 from the web server 50 of the external server 6.

According to this embodiment, the first web server 40 is provided on the image forming apparatus 2 constituted by MFP or the like. However, the first web server 40 is not required to be equipped in this manner. The foregoing first web server 40 may be provided on an information processing device such as an ordinary personal computer connected with the local network 4.

According to this embodiment, the external server 6 is contained in the cloud 5 provided on the Internet. However, the external server 6 is not required to be equipped in this manner. For example, the external server 6 may be provided on the local network 4.

According to an embodiment of the present invention, data transmission and reception is allowed between the first web server and the second web server via the browser. Accordingly, operation procedures are simplified at the time of transfer of data stored in a web server to another web server, and easy and rapid data transfer is achievable without raising costs.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An information processing system comprising a first web server and a second web server that communicate with each other via a browser started by an information processing device, wherein
the first web server includes
a first web page generating unit that generates a first web page containing a first script executable by the browser in response to a web page acquisition request from the browser, and
a first communicating unit that outputs the first web page to the browser, and receives data output from the browser,
the second web server includes
a second web page generating unit that generates a second web page containing a second script executable by the browser in response to a web page acquisition request from the browser, and a second communicating unit that outputs the second web page to the browser, and receives data output from the browser, the information processing device includes a storing unit, the first web server allows the browser to execute the first script contained in the first web page, in which state the browser functions as a web page acquiring unit that acquires the second web page from the second web server, a first data input/output control unit that transfers and obtains data to and from a second data input/output control unit which functions when the browser executes the second script contained in the second web page acquired by the web page acquiring unit, and a first server communication control unit that transmits and receives data to and from the first web server as data transferred and obtained between the first data input/output control unit and the second data input/output control unit, the second web server allows the browser to execute the second script contained in the second web page, in which state the browser functions as the second data input/output control unit, and a second server communication control unit that transmits and receives data to and from the second web server as data transferred and obtained between the second data input/output control unit and the first data input/output control unit, the first web server and the second web server transmit and receive data to and from the opposite server via the browser in a state where the first web page and the second web page are loaded into the storing unit, and the first web server is mounted on an image forming apparatus that includes an image forming unit capable of forming an image based on input image data, and outputs image data to the image forming unit when the first communicating unit acquires the image data from the second web server via the browser.

2. The information processing system according to claim 1, wherein the first web server allows the browser to display the first web page when the first communicating unit outputs the first web page to the browser, and prohibits the browser from displaying the second web page when the web page acquiring unit acquires the second web page.

3. The information processing system according to claim 2, wherein, when the first data input/output control unit acquires a data list from the second data input/output control unit, the data list is displayed on the first web page.

4. The information processing system according to claim 3, wherein, when at least one data contained in the data list is selected in a state that the data list is displayed on the first web page, the first data input/output control unit acquires the selected data from the second web server via the second data input/output control unit, and transmits the selected data to the first web server via the first server communication control unit.

5. The information processing system according to claim 1, wherein the information processing device is connected with each of the first web server and the second web server via a network, and the browser acquires the first web page and the second web page from the first web server and the second web server, respectively, via the network.

6. An information processing device that includes a web server function, the information processing device comprising:

a web page generating unit that generates a first web page incorporating a script executable by a browser in response to a web page acquisition request from the browser;

a communicating unit that outputs the first web page to the browser, and receives data output from the browser, and a storing unit, wherein the web page generating unit generates the first web page incorporating a script that allows the browser to function as a web page acquiring unit that acquires a second web page from a different web server, a first data input/output control unit that transfers and obtains data to and from a second data input/output control unit which functions when the browser executes a script contained in the second web page acquired by the web page acquiring unit, and a server communication control unit that transmits and receives data to and from the communicating unit as data transferred and obtained between the first data input/output control unit and the second data input/output control unit, the information processing device transmits and receives data to and from the different web server via the browser in a state where the first web page and the second web page are loaded into the storing unit, the different web server includes a second web page generating unit that generates the second web page, and a second communicating unit that outputs the second web page to the browser, and receives data output from the browser, and the information processing device is mounted on an image forming apparatus that includes an image forming unit capable of forming an image based on input image data, and outputs image data to the image forming unit when the communicating unit acquires the image data from the different web server via the browser.

7. The information processing device according to claim 6, allowing the browser to display the first web page when the communicating unit outputs the first web page to the browser, and prohibiting the browser from displaying the second web page when the web page acquiring unit acquires the second web page.

8. The information processing device according to claim 7, wherein, when the first data input/output control unit acquires a data list from the different web server via the second data input/output control unit, the data list is displayed on the first web page.

9. The information processing device according to claim 8, wherein, when at least one data contained in the data list is selected in a state that the data list is displayed on the first web page, the first data input/output control unit acquires the selected data from the different web server via the second data input/output control unit, and transmits the selected data to the information processing device via the server communication control unit.

10. A non-transitory recording medium storing a computer readable program which, when executed by an information processing device, causes the information processing device to:

generate a first web page incorporating a script executable by a browser in response to a web page acquisition request from the browser, and output the first web page to the browser, and receive data output from the browser, the first web page incorporating a script that allows the browser to:
- acquire a second web page from a different web server, and
- function as a first data input/output control unit that transfers and obtains data to and from a second data input/output control unit which functions when the browser executes a script contained in the second web page, the first data input/output control unit and the second data input/output control unit transferring and obtaining data to and from each other in a state where the first web page and the second web page are loaded into a storing unit of the information processing device, and the information processing device is mounted on an image forming apparatus that includes an image forming unit capable of forming an image based on input image data, and outputs image data to the image forming unit when the information processing device acquires the image data from the different web server via the browser.

11. The non-transitory recording medium according to claim 10, wherein the browser is allowed to display the first web page when the first web page is output to the browser, and the browser is prohibited from displaying the second web page when the web page acquiring unit acquires the second web page.

12. The non-transitory recording medium according to claim 11, wherein, when the first data input/output control unit acquires a data list from the different web server via the second data input/output control unit, the data list is displayed on the first web page.

13. The non-transitory recording medium according to claim 12, wherein, when at least one data contained in the data list is selected in a state that the data list is displayed on the first web page, the first data input/output control unit acquires the selected data from the different web server via the second data input/output control unit, and transmits the selected data to the information processing device via the server communication control unit.

14. A non-transitory recording medium storing a computer readable script program, the script program incorporated in a first web page output from a first web server to a browser, and, when executed by a hardware processor that functions as the browser, causes the browser to:
- acquire a second web page from a second web server different from the first web server, and
- function as a first data input/output control unit that transfers and obtains data to and from a second data input/output control unit which functions when the browser executes a script contained in the second web page, the first data input/output control unit and the second data input/output control unit transferring and obtaining data to and from each other in a state where the first web page and the second web page are loaded into a storing unit, the second web server includes a second web page generating unit that generates the second web page, and a communicating unit that outputs the second web page to the browser, and receives data output from the browser, and the hardware processor is configured to communicate with an image forming apparatus that includes an image forming unit capable of forming an image based on input image data, and outputs image data to the image forming unit when the hardware processor acquires the image data from the second web server via the browser.

\* \* \* \* \*